(12) United States Patent
Noh et al.

(10) Patent No.: US 9,071,391 B2
(45) Date of Patent: Jun. 30, 2015

(54) PILOT TRANSMITTING APPARATUS AND METHOD FOR SC-FDMA SYSTEM

(75) Inventors: Taegyun Noh, Daejon (KR); Minjoong Rim, Daejon (KR); Byung-Jang Jeong, Daejon (KR); Hyojin Lee, Daejon (KR); Hyun-Kyu Chung, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

(21) Appl. No.: 12/514,406

(22) PCT Filed: Oct. 30, 2007

(86) PCT No.: PCT/KR2007/005361
§ 371 (c)(1),
(2), (4) Date: Oct. 15, 2009

(87) PCT Pub. No.: WO2008/056900
PCT Pub. Date: May 15, 2008

(65) Prior Publication Data
US 2010/0039927 A1    Feb. 18, 2010

(30) Foreign Application Priority Data

Nov. 10, 2006  (KR) .................... 10-2006-0111215
Oct. 11, 2007  (KR) .................... 10-2007-0102610

(51) Int. Cl.
*H04J 11/00*    (2006.01)
*H04L 5/00*     (2006.01)
(Continued)

(52) U.S. Cl.
CPC ............... *H04L 5/0007* (2013.01); *H04J 11/00* (2013.01); *H04L 5/0028* (2013.01);
(Continued)

(58) Field of Classification Search
CPC ............................... H04J 11/00; H04W 72/00
USPC ................. 370/210–215, 260–276, 310–350; 375/260
See application file for complete search history.

(56) References Cited

U.S. PATENT DOCUMENTS

| | | | |
|---|---|---|---|
| 7,324,432 B1 * | 1/2008 | Kim .............................. | 370/208 |
| 7,720,162 B2 * | 5/2010 | Krishnamoorthi ............ | 375/260 |

(Continued)

FOREIGN PATENT DOCUMENTS

| | | |
|---|---|---|
| KR | 1020030094778 | 12/2003 |
| KR | 1020060114755 | 11/2006 |

(Continued)

OTHER PUBLICATIONS

Ofuji, Yoshiaki et al., "Frequency Domain Channel-Dependent Scheduling Employing an Adaptive Transmission Bandwidth for Pilot Channel in Uplink Single-Carrier-FDMA Radio Access," *IEEE 63rd Vehicular Technology Conference*, vol. 1:334-338 (2006).

(Continued)

*Primary Examiner* — Iqbal Zaidi
(74) *Attorney, Agent, or Firm* — Nelson Mullins Riley & Scarborough LLP

(57) ABSTRACT

Provided are a pilot transmitting apparatus and method capable of selectively using an OFDMA scheme and an SC-FDMA scheme. The pilot transmitting apparatus includes a pilot inserter for inserting a pilot signal in a modulated symbol and inserting a cyclic prefix code for the inserted pilot signal, an FFT processor for receiving symbols with a pilot inserted thereto from the pilot inserter and performing an FFT process on the received symbols, an IFFT processor for receiving the transformed data from the FFT processor and performing an IFFT process on the transformed data, a mapping processor for mapping the output of the FFT processor to input positions of the IFFT processor to load the frequency domain transformed data on predetermined sub-carriers, and a cyclic prefix inserter for inserting a cyclic prefix code for the output of the IFFT processor.

20 Claims, 3 Drawing Sheets

(51) Int. Cl.
*H04L 25/02* (2006.01)
*H04L 27/00* (2006.01)
*H04L 27/26* (2006.01)

(52) U.S. Cl.
CPC ......... *H04L 5/0048* (2013.01); *H04L 25/0226* (2013.01); *H04L 27/0008* (2013.01); *H04L 27/2607* (2013.01); *H04L 27/262* (2013.01)

(56) References Cited

U.S. PATENT DOCUMENTS

2002/0118765 A1   8/2002   Nangia et al.
2006/0098569 A1*  5/2006   Han et al. .................. 370/208

FOREIGN PATENT DOCUMENTS

| WO | WO2006/042326 | * | 4/2006 | .............. H04L 25/03 |
| WO | WO-2006/042326 A1 | | 4/2006 | |
| WO | WO2006042326 | * | 4/2006 | ............ H04W 72/00 |
| WO | WO2006/118411 | * | 11/2006 | .............. H04L 25/03 |
| WO | WO-2006/118411 A2 | | 11/2006 | |

OTHER PUBLICATIONS

International Search Report for Application No. PCT/KR2007/005361, dated Feb. 5, 2008.
Written Opinion for Application No. PCT/KR2007/005361, dated Feb. 5, 2008.

* cited by examiner

US 9,071,391 B2

PILOT TRANSMITTING APPARATUS AND METHOD FOR SC-FDMA SYSTEM

RELATED APPLICATIONS

This application is a 35 U.S.C. §371 national stage filing of PCT Application No. PCT/KR2007/005361 filed on Oct. 30, 2007, which claims priority to, and the benefit of, Korean Patent Application No. 10-2006-0111215 filed on Nov. 10, 2006 and Korean Patent Application No. 10-2007-0102610 filed on Oct. 11, 2007. The contents of the aforementioned applications are hereby incorporated by reference.

TECHNICAL FIELD

The present invention relates to a pilot transmitting apparatus and method for selectively using an orthogonal frequency division multiple access (OFDMA) scheme and a single carrier—frequency division multiple access (SC-FDMA) scheme; and, more particularly, to an apparatus and method for transmitting a pilot signal without using a short block by inserting the pilot signal in a data region in order to selectively use an OFDMA scheme and a SC-FDMA scheme based on a channel state in a next generation mobile communication system.

This work was supported by the IT R&D program of MIC/IITA [2006-S-001-01, "Development of Adaptive Radio Access and Transmission Technologies for $4^{th}$ Generation Mobile Communications"].

BACKGROUND ART

Lately, many researchers are studying Orthogonal Frequency Division Multiple Access (OFDMA) schemes and a Single Carrier Frequency Division Multiple Access (SC-FDMA) scheme in progress to develop a method for transmitting data through a radio channel at a high speed.

OFDMA is a scheme for transmitting data using multi-carrier. That is, OFDMA receives a serial symbol sequence and modulators the received serial symbol sequence to a plurality of sub-carriers having orthogonality by converting the serial symbol sequence to parallel data.

FIG. 1 is a block diagram illustrating a transmitter of an OFDMA system in accordance with the related art.

Referring to FIG. 1, the OFDMA transmitter includes an encoder 11, a modulator 12, a serial to parallel (S/P) converter 13, an N sized Inverse Fast Fourier Transform (IFFT) processor 14, a parallel to serial (P/S) converter 15, and a cyclic prefix (CP) inserter 16.

The encoder 11 performs a channel encoding process. That is, the encoder 11 receives sequences of information bits and performs the channel encoding process on the received sequences. In general, a convolutional encoder, a turbo encoder, or a low density parity check (LDPC) encoder is used as the encoder 11.

The modulator 12 performs a modulation process based on a quadrature phase shift keying scheme (QPSK), 8PSK, 16-ary quadrature amplitude modulation (16QAM), 64QAM, or 256QAM.

The S/P converter 13 receives the modulated data from the modulator 12 and converts the received data to parallel data. The IFFT processor 14 receives the parallel data from the S/P converter 13 and performs the IFFT process on the received parallel data. The P/S converter 15 converts the output from the IFFT processor 14 to serial data. The cyclic prefix inserter 16 inserts a cyclic prefix to the output data of the P/S converter 15.

The IFFT processor 14 converts frequency domain input data to time domain output data. Since input data is generally processed in a frequency domain in an OFDMA system, the OFDMA system has a disadvantage that a peak-to-average power ratio (PAPR) decreases when the IFFT processor 14 converts the frequency domain input data into the time domain output data.

The PAPR is one of critical factors to be considered to transmit data in a backward direction. If the PAPR increases, cell coverage becomes narrowed. Accordingly, a terminal requires increasing a signal power.

In order to overcome the shortcoming of the OFDMA system, a SC-FDMA scheme was introduced for uplink transmission.

FIG. 2 is a block diagram illustrating a transmitter of a SC-FDMA system in accordance with the related art.

Referring to FIG. 2, the transmitter for the SC-FDMA system includes an encoder 21, a modulator 22, a S/P converter 23, a Discrete Fourier Transform (DFT) processor 24, an IFFT processor 25, a P/S converter 26, and a cyclic prefix inserter 27.

The encoder 21 receives predetermined sequences of information bits and performs a channel encoding process thereon. The modulator 22 modulates the encoded data based on one of QPSK, 8PSK, 16QAM, 64QAM, and 256QAM schemes. The S/P converter 23 receives the modulated data from the modulator 22 and converts the modulated data to parallel data. The DFT processor 24 receives the parallel data from the S/P converter 23 and performs the DFT process thereon. The IFFT processor 25 receives the transformed data from the DFT processor 24 and performs the IFFT process thereon. Here, a mapping processor (not shown) may be disposed between the DFT processor 24 and the IFFT processor 25.

The mapping processor maps the output data of the DFT processor to the input data of the IFFT processor. That is, the mapping processor maps the output data of the DFT processor to corresponding input points of the IFFT processor to load the frequency domain data acquired from the DFT processor on sub-carriers. Here, the output symbols from the DFT processor are sequentially mapped to the input points of the IFFT processor in order to use consecutive sub-carriers on a frequency domain. Such a mapping method is referred as a localized allocation. Also, the output symbols from the DFT processor may be mapped to the input points of the IFFT processor at a predetermined interval in order to use sub-carriers separated at the same interval on a frequency domain. Such a mapping method is referred as a distribution allocation.

The P/S converter 26 converts the output data of the IFFT processor 25 to serial data. The cyclic prefix inserter 27 inserts a cyclic prefix in the output data of the P/S converter 26.

Meanwhile, a DFT function and an IDFT function may be replaced with an FFT function and an IFFT function. N may be an integer such as 1, 2, 3, and 4 for the DFT Function and the IDFT function. Also, N may be a square value of 2, such as 1, 2, 4, 8, and 16 for the FFT function and the IFFT Function.

FIG. 3 illustrates a sub-frame structure for SC-FDMA in accordance with the related art.

In the SC-FDMA scheme, a radio frame, a basic unit for backward transmission, is defined to have a length of 10 mn. A radio frame includes 20 sub-frames each having a length of 0.5 ms. One sub-frame includes six long blocks (LB) and two short blocks (SB). A cyclic prefix is inserted at the front of each block. The long block is for transmitting information except pilot data and the short block is for transmitting the pilot data only.

As described above, the SC-FDMA system has an advantage of a wide cell boundary for an uplink transmission of a terminal because the SC-FDMA system has a low PAPR. However, the SC-FDMA system has disadvantages as follows. That is, the performance of the SC-FDMA system deteriorates in high level modulation such as quadrature amplitude modulation (QAM), the SC-FDMA system is inefficient for a multi antenna system such as multiple input multiple output (MIMO) systems, the SC-FDMA system has a low flexibility of managing resources because of the necessity of a predetermined sub-carrier allocation method, and the SC-FDMA system has a difficulty in using various pilot patterns. Therefore, the SC-FDMA scheme is better for a wide cell boundary where a terminal requires increasing transmission power to transmit data. Otherwise, the OFDMA scheme is better. Accordingly, there is a demand for developing a method for selectively and adaptively using the SC-FDMA scheme and the OFDMA scheme in a terminal according to an environment in order to provide the optimal performance.

DISCLOSURE

Technical Problem

An embodiment of the present invention is directed to providing a pilot transmitting apparatus and method for transmitting a pilot signal by inserting the pilot signal into a data region without using a short block in order to selectively use an OFDMA scheme and a SC-FDMA scheme for uplink transmission in a next generation mobile communication system.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a pilot transmitting apparatus capable of selectively using capable of selectively using an Orthogonal Frequency Division Multiple Access (OFDMA) scheme and a Single Carrier Frequency Division Multiple Access (SC-FDMA) scheme, including: a pilot inserter for inserting a pilot signal in a modulated symbol and inserting a cyclic prefix code for the inserted pilot signal; a Fast Fourier Transform (FFT) processor for receiving symbols with a pilot inserted thereto from the pilot inserter and performing an FFT process on the received symbols; an inverse FFT (IFFT) processor for receiving the transformed data from the FFT processor and performing an IFFT process on the transformed data; a mapping processor for mapping the output of the FFT processor to input positions of the IFFT processor for loading the frequency domain data acquired in the FFT processor on predetermined sub-carriers; and a cyclic prefix inserter for inserting a cyclic prefix code for the output of the IFFT processor.

In accordance with another aspect of the present invention, there is provided a pilot transmitting apparatus capable of selectively using to selectively use an OFDMA scheme and a SC-FDMA scheme, including: a pilot inserter for inserting a pilot signal in a modulated symbol and inserting a cyclic prefix code for the inserted pilot signal; an up-sampling unit for receiving the pilot inserted symbols from the pilot inserter and performing an up-sampling process on the received symbols; an interpolation processor for performing an interpolation process by performing cyclic convolution based on an interpolation filter value in order to load frequency domain data on corresponding sub-carriers for the output of the up-sampling unit; and a cyclic prefix inserter for inserting a cyclic prefix code for the output of the interpolation processor.

In accordance with another aspect of the present invention, there is provided a pilot transmitting method capable of selectively using to selectively use an OFDMA scheme and an SC-FDMA scheme, including the steps of: inserting a pilot signal in a modulated symbol and inserting a cyclic prefix Code for the inserted pilot signal; spreading the pilot inserted symbols through FFT; performing an IFFT process for allocating sub-carriers based on a localized allocation scheme for the frequency domain data acquired in the FFT; and inserting a cyclic prefix code for the IFFT data.

In accordance with another aspect of the present invention, there is provided a pilot transmitting method capable of selectively using an OFDMA scheme and an SC-FDMA scheme, including the steps of: inserting a pilot signal to a modulated symbol and inserting a cyclic prefix code for the inserted pilot; up-sampling symbols with a pilot inserted thereto; performing an interpolation process by performing cyclic convolution based on an interpolation filter value in order to load frequency domain data on corresponding sub-carriers for the output of the up-sampling means; and inserting a cyclic prefix code for the interpolated output data.

Advantageous Effects

A pilot transmitting apparatus and method according to an embodiment of the present invention enables a next generation mobile communication system to transmit a pilot signal without using a short block by inserting a pilot signal in an SC-FDMA symbol. Therefore, channel estimation can be performed while sustaining a typical symbol structure. Also, the pilot transmitting apparatus and method enables the next generation mobile communication system to selectively use the OFDMA scheme and the SC-FDMA according to a channel state. Furthermore, the pilot transmitting apparatus and method allows a pilot signal stored in an SC-FDMA symbol to have free pattern. Therefore, one of pilot patterns can be selected and used properly to a channel environment.

BEST MODE FOR THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
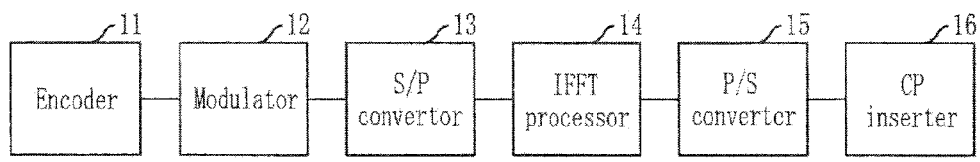
FIG. 1 is a block diagram illustrating a transmitter of an OFDMA system in accordance with the related art.
Figure 2:
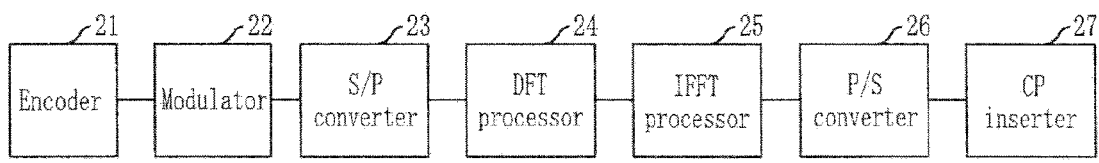
FIG. 2 is a block diagram illustrating a transmitter of an SC-FDMA system in accordance with the related art.
Figure 3:
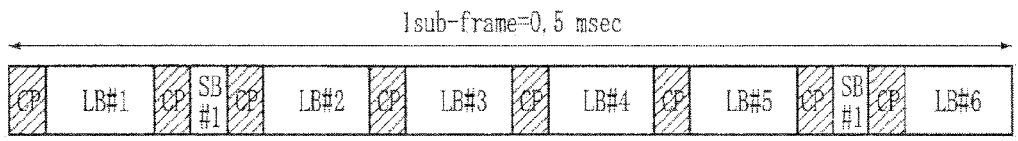
FIG. 3 is a diagram illustrating a sub-frame structure for SC-FDMA in accordance with the related art.
Figure 4:
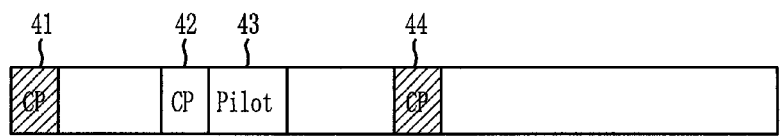
FIGS. 4 and 5 are diagrams illustrating a point where a pilot signal is inserted in an SC-FDMA symbol in accordance with an embodiment of the present invention.
Figure 5:
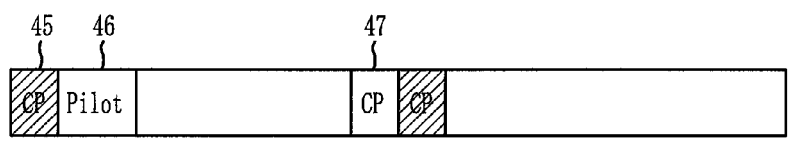

FIGS. 4 and 5 are diagrams illustrating a point where a pilot signal is inserted in an SC-FDMA symbol in accordance with an embodiment of the present invention.

It is possible to select one of the SC-FDMA scheme and the OFDMA scheme in case of block hopping because each of blocks is generally independent at a frequency domain. However, it is necessary to add an additional block for a pilot signal, for example, a short block, in the SC-FDMA system for using both of the SC-FDMA scheme and the OFDMA scheme. Also, it is required to insert the pilot signal in a predetermined position of data similar to the OFDMA scheme.

In the present embodiment, a pilot signal is inserted in a predetermined position of an SC-FDMA symbol block to perform channel estimation without using an additional short block as shown in FIGS. 4 and 5. Accordingly, the block structures of the OFDMA scheme and the SC-FDMA scheme can be identically sustained, and each of the blocks can freely select one of the OFDMA scheme and the SC-FDMA scheme.

FIG. 4 shows a start position of a pilot signal inserted in a symbol. In FIG. 4, the start position is not 0. A reference numeral 41 and 44 denote cyclic prefixes for a guard interval of a signal. A reference numeral 43 denotes pilot signal inserted in a symbol, and a reference numeral 42 is a cyclic prefix for the pilot signal.

FIG. 5 shows a start position of pilot signal inserted in a symbol. In FIG. 5, the start position is 0. A reference numeral 45 is a cyclic prefix code for a guard interval of a signal, and a reference numeral 46 denotes a pilot signal inserted in a symbol. A reference numeral 47 is a cyclic prefix code for pilot signal.

Figure 6:
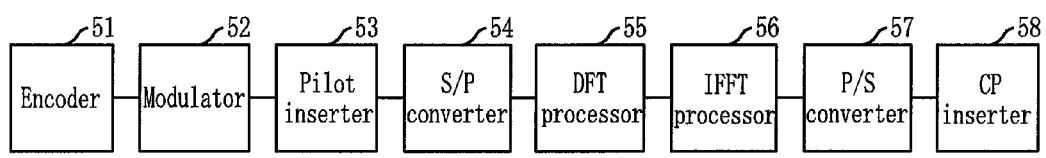
FIG. 6 is a block diagram illustrating a transmitting apparatus in accordance with an embodiment of the present invention.

FIG. 6 is a block diagram illustrating a pilot transmitting apparatus in accordance with an embodiment of the present invention.

The transmitting apparatus according to the present embodiment includes an encoder 51, a modulator 52, a pilot inserter 53, a serial to parallel (S/P) converter 54, a discrete fourier transform (DFT) processor, an N-sized inverse fast fourier transform (IFFT) processor 56, a parallel to serial (P/S) converter 57, and a cyclic prefix inserter 58.

The encoder 51 receives a bit sequence of data to transmit and performs a channel encoding process on the received bit sequence. The modulator 52 modulates the channel-encoded data from the encoder 51 based on one of QPSK, 8PSK, 16QAM, 64QAM, and 256QAM.

Figure 9:
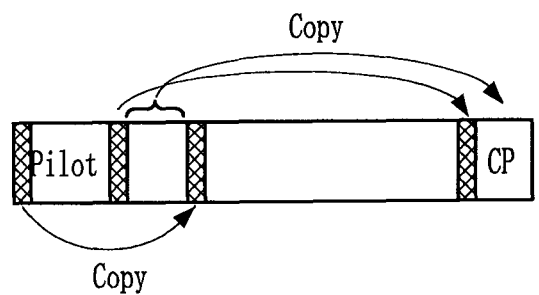

The pilot inserter 53 receives a pilot signal and inserts the received pilot signal in a symbol. As shown in FIGS. 4 and 5, the pilot signal may be inserted at 0 as the start position or a predetermined position in a signal. A method of inserting the pilot signal is identical to a method of inserting a pilot signal using a short block. Also, the pilot inserter 53 inserts a cyclic prefix code for a pilot signal in a symbol. In other words, the pilot inserter 53 inserts the cyclic prefix code by copying the last part of the pilot signal. Or, the pilot inserter 53 copies a predetermined beginning part of the pilot signal into the last part of the pilot signal and copies the adjacent signal of the copied signal for the cyclic prefix of the pilot signal into the front of the cyclic prefix interval to spread the cyclic prefix interval as shown in FIG. 9 in order to enable IFFT processed intermediate values to satisfy the cyclic prefix interval. In the present embodiment, the pilot inserter is disposed at the rear end of the modulator 52. However, the pilot inserter 53 may be disposed at the rear end of the S/P converter 54.

The S/P converter 54 receives the modulated data from the modulator 52 and the data with the pilot signal inserted from the pilot inserter 53 and converts the received data into parallel data. The DFT processor 55 spreads the symbol through the DFT process on the parallel data from the S/P converter 54.

A mapping processor (not shown) may be disposed between the DFT processor 55 and the IFFT processor 56. The mapping processor maps the output data of the DFT processor 55 to input points of the IFFT Processor 57 to load the output data of the frequency domain from the DFT processor 55 to corresponding sub-carriers. In the present embodiment, a localized allocation method is used, which maps the output symbols of the DFT processor 55 to the input points of the IFFT processor 56, sequentially.

If the localized allocation method is used to allocate the DFT processed data of the frequency domain to continuous sub carriers, a symbol allocated at a predetermined position P can be expressed like Eq. 1.

$$X(k) = \begin{cases} S(k-P) & P - L/2 \le k < P + L/2 \\ 0 & \text{otherwise} \end{cases} \qquad \text{Eq. 1}$$

The mapping processor may allocate a sub carrier using a window. In other word, the mapping processor reduces a tail part of a sub carrier for approximating IFFT processed symbols. If a rectangular sub-carrier is allocated at a frequency domain, a signal may have a sinc function. However, if a sub-carrier is allocated after applying a raised-cosine window, the tail part of a signal can be significantly reduced.

If the tail part of a signal is reduced by applying such a window, the IFFT processed symbols become identical because it is less influenced by adjacent values. Also, if a window is applied, the peak-to-average power ratio (PAPR) can be reduced too. However, more sub-carriers will be used if the window is applied. Therefore, the resources may be wasted.

The IFFT processor 56 performs an IFFT process on the mapped data from the mapping processor based on the localized allocation method. The P/S converter 57 converts the output data of the IFFT processor 56 to serial data. The cyclic prefix inserter 58 inserts a CP code in the output data of the P/S converter 57.

As described above, the DFT function and the IDFT function may be replaced with an FFT function and an IFFT function.

Figure 7:
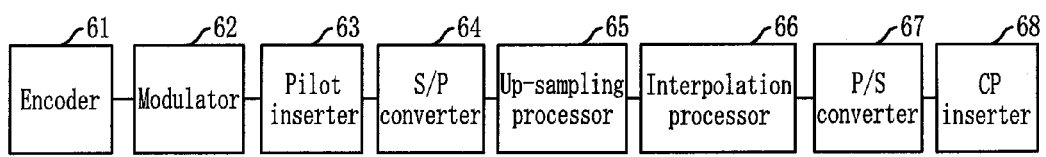
FIG. 7 is a block diagram illustrating a transmitting apparatus in accordance with another embodiment of the present invention.
Figure 8:
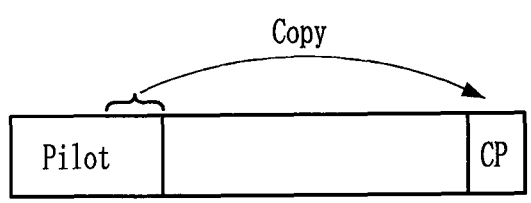
FIGS. 8 and 9 are diagrams for describing a procedure of creating a cyclic prefix code for a pilot signal in accordance with an embodiment of the present invention.

FIG. 7 is a block diagram illustrating a pilot transmitting apparatus in accordance with another embodiment of the present invention.

Referring to FIG. 7, the pilot transmitting apparatus according to the present embodiment includes an encoder 61, a modulator 62, a pilot inserter 63, a S/P converter 64, an up-sampling processor 65, an interpolation processor 66, a P/S converter 67, and an CP inserter 68.

The encoder 61 receives a bit sequence of data to transmit and performs a channel encoding process thereon. The modulator 62 modulates the channel-encoded data from the encoder 61 based on one of QPSK, 8PSK, 16QAM, 64QAM, and 256QAM.

As described above with reference to FIG. 6, the pilot inserter 63 receives a pilot signal and inserts the pilot signal in a symbol. The pilot signal may be inserted at 0 as a start position or at a predetermined position between signals. The pilot inserter 63 inserts a cyclic prefix code for the inserted pilot signal in a symbol. In the present embodiment, the pilot inserter 63 is disposed at the rear end of the modulator 62. However, the pilot inserter 63 may be inserted at the rear end of the S/P converter 64.

The S/P converter 64 receives the modulated data from the modulator 62 and the pilot inserted data from the pilot inserter 63 and converts the received data to parallel data. The up-sampling processor 65 up-samples the parallel data from the S/P converter 64.

The interpolation processor 66 performs an interpolation process on the up-sampled symbols from the up-sampling processor 65. The interpolation processor 66 allocates a sub-carrier by applying a window. In other words, the interpolation processor 66 reduces the tail part of the sub-carrier signal in order to make the interpolated symbols identical. If a rectangular sub-carrier is allocated at a frequency domain, the sub-carrier signal may have a sinc function. However, the tail part of a signal can be significantly reduced by applying a raised-cosine window in a frequency domain for allocating a sub-carrier.

If the tail part of a signal is reduced by applying such a window, the interpolated symbols may be identical because it is less influenced by adjacent values. Also, if a window is applied, the peak-to-average power ratio (PAPR) can be reduced too. However, more sub-carriers will be used if the window is applied. Therefore, the resources may be wasted. The up-sampling processor 65 and the interpolation processor 66 will be described in later.

The P/S converter 67 converts the output data of the interpolation processor 66 to serial data. The cyclic prefix inserter 68 inserts a cyclic prefix code in the output data of the P/S converter 67.

Hereinafter, the operations of the up-sampling processor 65 and the interpolation processor 66 will be described.

A procedure of interpolating a time domain signal S to an interpolated output signal x in a localized allocation based SC-FDMA system will be described. At first, the up-sampling processor 65 up-samples the time domain signal S. Then, the interpolation process 66 performs circular convolution on the up-sampled signal and an interpolation filter value.

If N/L is an integer with conditions of 0≤n<N and 0≤l<L, the time domain signal S is up-sampled as shown in Eq. 2.

$$\tilde{s}(n) = \begin{cases} s(l) & n = lN/L \\ 0 & \text{otherwise} \end{cases} \quad \text{Eq. 2}$$

If N/L is an integer with condition of −N/2≤n<N/2, the interpolation filter value g(n) is defined like Eq. 3.

$$g(n) \equiv \frac{1}{L}\sum_{m=-L/2}^{L/2-1} e^{j2\pi(m+P)n/N} \quad \text{Eq. 3}$$

$$= \frac{1}{L}\frac{\sin(\pi nL/N)}{\sin(\pi n/N)}e^{j\pi n(L-1+2P)/N}$$

The interpolation processor 66 interpolates a signal and outputs the interpolated signal x. The interpolated signal x can be expressed as Eq. 4.

$$x(n) = \sum_{k=0}^{N-1} X(k)e^{j2\pi nk/N} \quad \text{Eq. 4}$$

$$= \sum_{m=-L/2}^{L/2-1} S(m)e^{j2\pi n(P+m)/N}$$

$$= \sum_{m=-L/2}^{L/2-1}\left(\frac{1}{L}\sum_{l=0}^{L-1} s(l)e^{-j2\pi lm/L}\right)e^{j2\pi n(m+P)/N}$$

$$= \sum_{l=0}^{L-1} s(l)e^{j2\pi lP/L}\frac{1}{L}\sum_{m=-L/2}^{L/2-1} e^{j2\pi(m+P)(n-lN/L)/N}$$

$$= \sum_{l=0}^{L-1} s(l)e^{j2\pi lP/L}g(n-lN/L)$$

$$= \sum_{k=0}^{N-1} \tilde{s}(k)e^{j2\pi kP/N}g(n-k)$$

$$= \tilde{s}(n)e^{j2\pi nP/N}*g(n)$$

Since the interpolation filter value of Eq. 3 satisfies the same characteristics of Eq. 5, the interpolation filter value can be defined as Eq. 6. The other values have a value interpolated by the interpolation processor.

$$g(0)=1$$

$$g(lN/L)=0 (0<l<L) \quad \text{Eq. 5}$$

$$x(lN/L) = \tilde{s}(lN/L)e^{j2\pi lP/L} \quad \text{Eq. 6}$$

$$= s(l)e^{j2\pi lP/L}$$

If it is assumed that a start position of a pilot signal is 0, the pilot signal occupies 1/J of the SC-FDMA symbol, and a size of a cyclic prefix interval is K, then the cyclic prefix interval of the pilot signal must be satisfied by Eq. 7.

$$x(n)=x(n-(J-1)N/J)$$

$$(N-K\leq n\leq N) \quad \text{Eq. 7}$$

In order to create the cyclic prefix interval for the pilot signal, a time domain signal S must be defined as Eq. 8.

$$s(l)=s(l-(J-1)L/J)e^{-j2\pi P(J-1)/J}$$

$$(L-KL/N\leq l<L) \quad \text{Eq. 8}$$

Eq. 9 shows the up-sampled signal $\tilde{s}$ of the time domain signal S.

$$\tilde{s}(n)=\tilde{s}(n-(J-1)N/J)e^{-j2\pi P(J-1)/J}$$

$$(N-K\leq n<N) \quad \text{Eq. 9}$$

Eq. 10 shows a value after interpolating the up-sampled signal at the interpolation processor 66.

$$x(n)|_{n=lN/L} = \tilde{s}(n)e^{j2\pi nP/N} * g(n)|_{n=lN/L} \quad \text{Eq. 10}$$
$$= \tilde{s}(n - (J-1)N/J)e^{-j2\pi P(J-1)/J}e^{j2\pi nP/N} *$$
$$g(n)|_{n=lN/L}$$
$$= \tilde{s}(n - (J-1)N/J)e^{j2\pi P(n-(J-1)N/J)/N} *$$
$$g(n)|_{n=lN/L}$$
$$= x(n - (J-1)N/J)|_{n=lN/L}$$

$$(N - K \le n < N)$$

The intermediate values interpolated by Eq. 10 cannot satisfy Eq. 7. In order to satisfy Eq. 7, the cyclic prefix code must be spread as shown in FIG. 9. If a cyclic prefix code extension interval is α, the time domain signal s is defined as Eq. 11.

$$s(l) = \begin{cases} s(l - (J-1)L/J)e^{-j2\pi P(J-1)/J} \\ (L - KL/N - \alpha/2 \le l < L) \\ s(l - L/J)e^{-j2\pi P/J} \\ (L/J \le l < L/J + \alpha/2) \end{cases} \quad \text{Eq. 11}$$

The other method for approximating the interpolated value is reducing a tail part of a signal. If a rectangular sub-carrier is allocated at a frequency domain using Eq. 11, an interpolation filter obtains the since function of Eq. 3. However, if a sub-carrier is allocated by adapting a raised-cosine window at the frequency domain, the tail part of the interpolation filter is significantly reduced. That is, a window of a frequency domain is β(k), the sub-carrier allocation can be expressed as Eq. 12.

$$X(k) = \beta(k)S(\text{mod}(k-P,L)) \quad \text{Eq. 12}$$

The interpolation filter $\tilde{g}(n)$ ($OD_n < N$) can be defined as Eq. 13 when a window is applied.

$$\tilde{g}(n) \equiv \frac{1}{L}\sum_{k=0}^{N-1} \beta(k)e^{j2\pi kn/N} \quad \text{Eq. 13}$$

When Eq. 13 is adapted, the interpolated signal x is expressed as Eq. 14.

$$x(n) = \sum_{k=0}^{N-1} X(k)e^{j2\pi nk/N} \quad \text{Eq. 14}$$
$$= \sum_{k=0}^{N-1} \beta(k)S(\text{mod}(k-P,L))e^{j2\pi nk/N}$$
$$= \sum_{k=0}^{N-1} \beta(k)\left(\frac{1}{L}\sum_{l=0}^{L-1} s(l)e^{-j2\pi l(k-P)/L}\right)e^{j2\pi nk/N}$$
$$= \sum_{l=0}^{L-1} s(l)e^{j2\pi lP/L}\frac{1}{L}\sum_{k=0}^{N-1} \beta(k)e^{j2\pi k(n-lN/L)/N}$$

-continued
$$= \sum_{l=0}^{L-1} s(l)e^{j2\pi lP/L}\tilde{g}(n - lN/L)$$
$$= \sum_{k=0}^{N-1} \tilde{s}(k)e^{j2\pi kP/N}\tilde{g}(n-k)$$
$$= \tilde{s}(n)e^{j2\pi nP/N} * \tilde{g}(n)$$

If the window is applied, the size of the tail part of the interpolation filter is reduced and the interpolated value becomes identical because the interpolated value is hardly influenced by adjacent values. However, applying window may waste resource because it uses more sub-carriers.

As described above, the technology of the present invention can be realized as a program. The codes and code segments constituting the program may be easily inferred by a computer programmer of the present invention to which the present invention pertains. The program may be stored in a computer-readable recording medium, i.e., a data storage, and read and executed by a computer to implement the method of the present invention. The recording medium includes all types of data storing media whose data can be read by a computer.

The present application contains subject matter related to Korean Patent Application No. 2006-0111215, filed in the Korean Intellectual Property Office on Nov. 10, 2006, and Korean Patent Application No. 2007-0102610, filed in the Korean Intellectual Property Office on Oct. 11, 2007, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A data transmitting apparatus in wireless communication system, comprising:
    an encoder for performing channel encoding on the data;
    a modulator for modulating the channel-encoded data and outputting a modulated symbol;
    a pilot inserter for inserting a pilot signal and a first cyclic prefix code in the modulated symbol, wherein the first cyclic prefix code is inserted in the modulated symbol after the pilot signal is inserted in the modulated symbol, and is inserted in the modulated symbol by using at least a portion of the pilot signal inserted in the modulated symbol;
    a discrete fourier transform (DFT) processor for receiving the modulated symbol in which the pilot signal and the first cyclic prefix code are inserted, and performing an DFT process on the received modulated symbol;
    a mapping processor for mapping the output of the DFT processor to sub-carriers of an inverse DFT (IDFT) processor;
    the IDFT processor for performing an IDFT process on the output of the DFT processor; and
    a cyclic prefix inserter for inserting a second cyclic prefix code in the output of the IDFT processor.

2. The apparatus of claim 1, wherein the pilot inserter inserts the pilot signal at a starting position of the modulated symbol.

3. The apparatus of claim 1, wherein the first cyclic prefix code is a part of the pilot signal.

4. The apparatus of claim 1, wherein the pilot inserter inserts the first cyclic prefix code at an end position of the modulated symbol.

5. The apparatus of claim 1, wherein the mapping processor applies a window filter to the output of the DFT processor.

6. The apparatus of claim 1, wherein the mapping processor consecutively maps the output of the DFT processor to the sub-carriers of the IDFT processor.

7. A data transmitting apparatus in wireless communication system, comprising:
   an encoder for performing channel encoding on the data;
   a modulator for modulating the channel-encoded data and outputting a modulated symbol;
   a pilot inserter for inserting a pilot signal and a first cyclic prefix code in the modulated symbol, wherein the first cyclic prefix code is inserted in the modulated symbol after the pilot signal is inserted in the modulated symbol, and is inserted in the modulated symbol by using at least a portion of the pilot signal inserted in the modulated symbol;
   an up-sampling processor for receiving the modulated symbol in which the pilot signal and the first cyclic prefix code are inserted, and performing an up-sampling process on the received modulated symbol;
   an interpolation processor for performing an interpolation process by performing cyclic convolution with an interpolation for the output of the up-sampling processor; and
   a cyclic prefix inserter for inserting a second cyclic prefix code in the output of the interpolation processor.

8. The apparatus of claim 7, wherein the pilot inserter inserts the pilot signal at a starting position of the modulated symbol.

9. The apparatus of claim 7, wherein the first cyclic prefix code is a part of the pilot signal.

10. The apparatus of claim 7, wherein the pilot inserter inserts the first cyclic prefix code at an end position of the modulated symbol.

11. The apparatus of claim 7, wherein the interpolation processor applies a window filter to the output of the up-sampling processor.

12. The apparatus of claim 7, wherein the interpolation processor consecutively allocates sub-carriers.

13. A data transmitting method in wireless communication system, comprising the steps of:
   performing channel encoding on the data;
   modulating the channel-encoded data and outputting a modulated symbol;
   inserting a pilot signal and a first cyclic prefix code in the modulated symbol, wherein the first cyclic prefix code is inserted in the modulated symbol after the pilot signal is inserted in the modulated symbol, and is inserted in the modulated symbol by using at least a portion of the pilot signal inserted in the modulated symbol;
   performing the discrete Fourier transform (DFT) process for the modulated symbol in which the pilot signal and the first cyclic prefix code are inserted through discrete fourier transform (DFT);
   mapping the modulated symbol acquired from the DFT to sub-carriers for an IDFT process;
   performing the IDFT process for the modulated symbol acquired from the DFT process; and
   inserting a second cyclic prefix code in the modulated symbol acquired from the IDFT process.

14. The method of claim 13, wherein the step of inserting a pilot signal and a first cyclic prefix code for the pilot signal in the modulated symbol includes inserting the pilot signal at a starting position of the modulated symbol.

15. The method of claim 13, wherein the first cyclic prefix code is a part of the pilot signal.

16. The method of claim 13, wherein the step of inserting a pilot signal and a first cyclic prefix code for the pilot signal in the modulated symbol includes inserting the first cyclic prefix code at a end position of the modulated symbol.

17. A data transmitting method in wireless communication system, comprising the steps of:
   performing channel encoding on the data;
   modulating the channel-encoded data and outputting a modulated symbol;
   inserting a pilot signal and a first cyclic prefix code in the modulated symbol, wherein the first cyclic prefix code is inserted in the modulated symbol after the pilot signal is inserted in the modulated symbol, and is inserted in the modulated symbol by using at least a portion of the pilot signal inserted in the modulated symbol;
   up-sampling the modulated symbol in which the pilot signal and the first cyclic prefix code are inserted;
   performing an interpolation process by performing cyclic convolution with an interpolation filter for the output data of the up-sampling; and
   inserting a second cyclic prefix code for the interpolated output data.

18. The method of claim 17, wherein the step of inserting a pilot signal and a first cyclic prefix code for the pilot signal in the modulated symbol includes inserting the pilot signal at a starting position of the modulated symbol.

19. The method of claim 17, wherein the first cyclic prefix code is a part of the pilot signal.

20. The method of claim 17, wherein the step of inserting a pilot signal and a first cyclic prefix code for the pilot signal in the modulated symbol includes inserting the first cyclic prefix code at an end position of the modulated symbol.

* * * * *